United States Patent
Liu et al.

(10) Patent No.: US 10,120,442 B2
(45) Date of Patent: Nov. 6, 2018

(54) EYE TRACKING USING A LIGHT FIELD CAMERA ON A HEAD-MOUNTED DISPLAY

(71) Applicant: Oculus VR, LLC, Menlo Park, CA (US)

(72) Inventors: Xinqiao Liu, Medina, WA (US); Elias Daniel Guestrin, Redmond, WA (US)

(73) Assignee: Oculus VR, LLC, Menlo Park, CA (US)

( * ) Notice: Subject to any disclaimer, the term of this patent is extended or adjusted under 35 U.S.C. 154(b) by 33 days.

(21) Appl. No.: 15/387,439

(22) Filed: Dec. 21, 2016

(65) Prior Publication Data

US 2018/0173303 A1    Jun. 21, 2018

(51) Int. Cl.
| G06T 17/00 | (2006.01) |
| G06F 3/01 | (2006.01) |
| G06F 3/03 | (2006.01) |
| G06T 7/73 | (2017.01) |
| G06T 3/40 | (2006.01) |
| G02B 27/00 | (2006.01) |

(52) U.S. Cl.
CPC ......... G06F 3/013 (2013.01); G02B 27/0025 (2013.01); G06F 3/0304 (2013.01); G06T 3/40 (2013.01); G06T 7/73 (2017.01); *G06T 2207/10052* (2013.01); *G06T 2207/10152* (2013.01); *G06T 2207/30201* (2013.01)

(58) Field of Classification Search
CPC ................................. G06T 11/20; G06T 15/00
USPC .......................................................... 345/428
See application file for complete search history.

(56) References Cited

U.S. PATENT DOCUMENTS

| 2010/0220291 A1* | 9/2010 | Horning ............... G02B 27/017 351/210 |
| 2013/0050070 A1* | 2/2013 | Lewis ..................... A61B 3/113 345/156 |
| 2013/0114850 A1* | 5/2013 | Publicover ......... G06K 9/00604 382/103 |
| 2013/0278829 A1* | 10/2013 | Tegzes ..................... H04N 5/21 348/607 |
| 2014/0184475 A1* | 7/2014 | Tantos ................ H03M 13/356 345/8 |
| 2015/0185475 A1* | 7/2015 | Saarikko ............ G02B 6/02085 382/117 |

(Continued)

OTHER PUBLICATIONS

C.-K. Liang and R. Ramamoorthi. A light transport framework for lenslet light field cameras. ACM Transactions on Graphics (TOG), 34(16):16:1-16:19, 2015.*

*Primary Examiner* — Jin Ge
(74) *Attorney, Agent, or Firm* — Fenwick & West LLP

(57) ABSTRACT

A head mounted display (HMD) includes one or more light field cameras for tracking one or both eyes of a user wearing the HMD. The HMD optionally includes light sources positioned inside the HMD and that illuminate one or both of the eyes of the user. The light field camera captures a plenoptic image of the user's eye. The plenoptic image includes light intensity data and direction data of the captured light rays. An eye tracking system updates a 3D light field model of the user's eye based on depth information from the plenoptic image frame. The eye tracking system identifies an iris plane of the user's eye using the 3D light field model. The eye tracking system determines a gaze direction of the user's eye by identifying the normal to the center of the iris plane.

23 Claims, 6 Drawing Sheets

(56) References Cited

U.S. PATENT DOCUMENTS

| | | | |
|---|---|---|---|
| 2015/0310253 A1* | 10/2015 | Agrawal | G06K 9/0061 |
| | | | 382/103 |
| 2016/0180591 A1* | 6/2016 | Shiu | G02B 27/0172 |
| | | | 345/633 |
| 2016/0262608 A1* | 9/2016 | Krueger | A61B 3/0041 |
| 2016/0342206 A1* | 11/2016 | Shazly | A61B 5/1114 |
| 2017/0004363 A1* | 1/2017 | Dore | G02B 27/0176 |
| 2017/0038837 A1* | 2/2017 | Faaborg | G06F 3/0482 |
| 2017/0169602 A1* | 6/2017 | Blackmon | G06F 3/013 |

* cited by examiner

EYE TRACKING USING A LIGHT FIELD CAMERA ON A HEAD-MOUNTED DISPLAY

BACKGROUND

This description generally relates to head-mounted displays (HMDs), and specifically relates to eye tracking using a light field camera on a HMD.

Light field cameras, or plenoptic cameras, can take images including information about both the intensity of light and the direction of captured light rays. In contrast, a conventional camera only captures light intensity without information describing light ray directions. Existing technologies take advantage of light field cameras for photography. In particular, image processing techniques can refocus on a different part of an image after a light field camera has taken the image. For example, the image was originally focused on a distant tree in the background, and refocused on a flower up close in the foreground.

SUMMARY

A head mounted display (HMD) in a virtual reality (VR) or augmented reality (AR) system includes one or more light field cameras for tracking the eyes of a user wearing the HMD. The HMD may include light sources positioned inside the HMD and that illuminate the user's eyes inside the HMD. The one or more light field cameras capture plenoptic images of the user's eyes. A plenoptic image includes light intensity data as well as direction data of the captured light rays. For a given eye of the user, an eye tracking system updates a 3D light field model of the eye based on depth information from the plenoptic image. The eye tracking system identifies an iris plane of the user's eye using the 3D light field model. The eye tracking system determines a gaze direction of the user's eye by identifying the normal to the center of the iris plane.

Since the light field camera can capture light direction data, the eye tracking system does not need to rely on a corneal spherical reflection model or glint location to calculate the center of the cornea of the user's eye. Accordingly, there is no requirement for an external illumination source to be positioned at a particular location relative to the light field camera. Additionally, there is more latitude as to where the light field camera can be positioned inside the HMD. The gaze direction of the user's eye may be used to control an electronic display of the HMD. For example, portions of the electronic display corresponding with the user's gaze direction render images in high resolution, while other portions of the electronic display render images in a lower resolution to save computational resources of the HMD.

The figures depict embodiments of the present disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
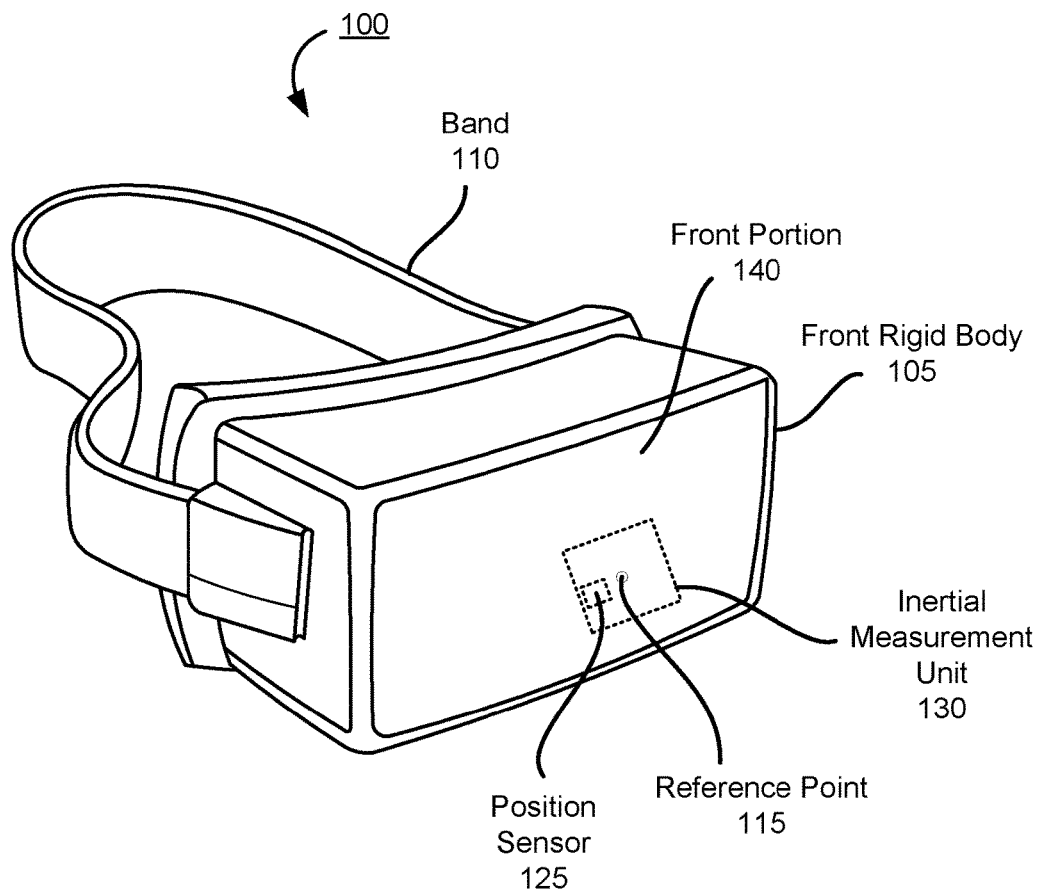
FIG. 1 is a wire diagram of a HMD in accordance with an embodiment.

FIG. 1 is a wire diagram of a HMD 100 in accordance with an embodiment. The HMD 100 includes a front rigid body 105 and a band 110. The front rigid body 105 includes an eye tracking system (not shown). In some embodiments, the HMD 100 also includes a position sensor 125 and an inertial measurement unit (IMU) 130, as described in detail with regard to FIG. 4. A user can wear the HMD 100 by using the band 110 to hold the HMD 100 in position on the user's head. In the embodiment shown by FIG. 1, the position sensor 125 is located within the IMU 130, and neither the IMU 130 nor the position sensor 125 is visible to the user.

The HMD 100 presents content to a user wearing the HMD 100. Examples of content presented by the HMD 100 include one or more images, video, audio, or some combination thereof. In some embodiments, audio is presented via an external device (e.g., speakers and/or headphones) that receives audio information from the HMD 100, a console (e.g., the console further described with reference to FIG. 4), or both, and presents audio data based on the audio information. In some embodiments, the HMD 100 may act as a VR headset, an augmented reality (AR) headset, a mixed reality (MR) headset, or some combination thereof. In embodiments that describe AR system environment, the HMD 100 augments views of a physical, real-world environment with computer-generated elements (e.g., images, video, sound, etc.). In embodiments that describe MR system environment, the HMD 100 merges views of physical, real-word environment with virtual environment to produce new environments and visualizations where physical and digital objects co-exist and interact in real time. In embodiments where the HMD 100 is configured to operate in at least a AR and/or MR environment, portions of the HMD 100 may be at least a partially transparent. For example a front portion 140 of the front rigid body and elements which lie between the front portion 140 and one or both eyes of the user (e.g., an electronic display).

In one example, the HMD 100 comprises one or more rigid bodies (e.g., the front rigid body 105), which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. The eye tracking system includes at least one light field camera and is described in detail below with regard to FIGS. 2-4.

Figure 2:
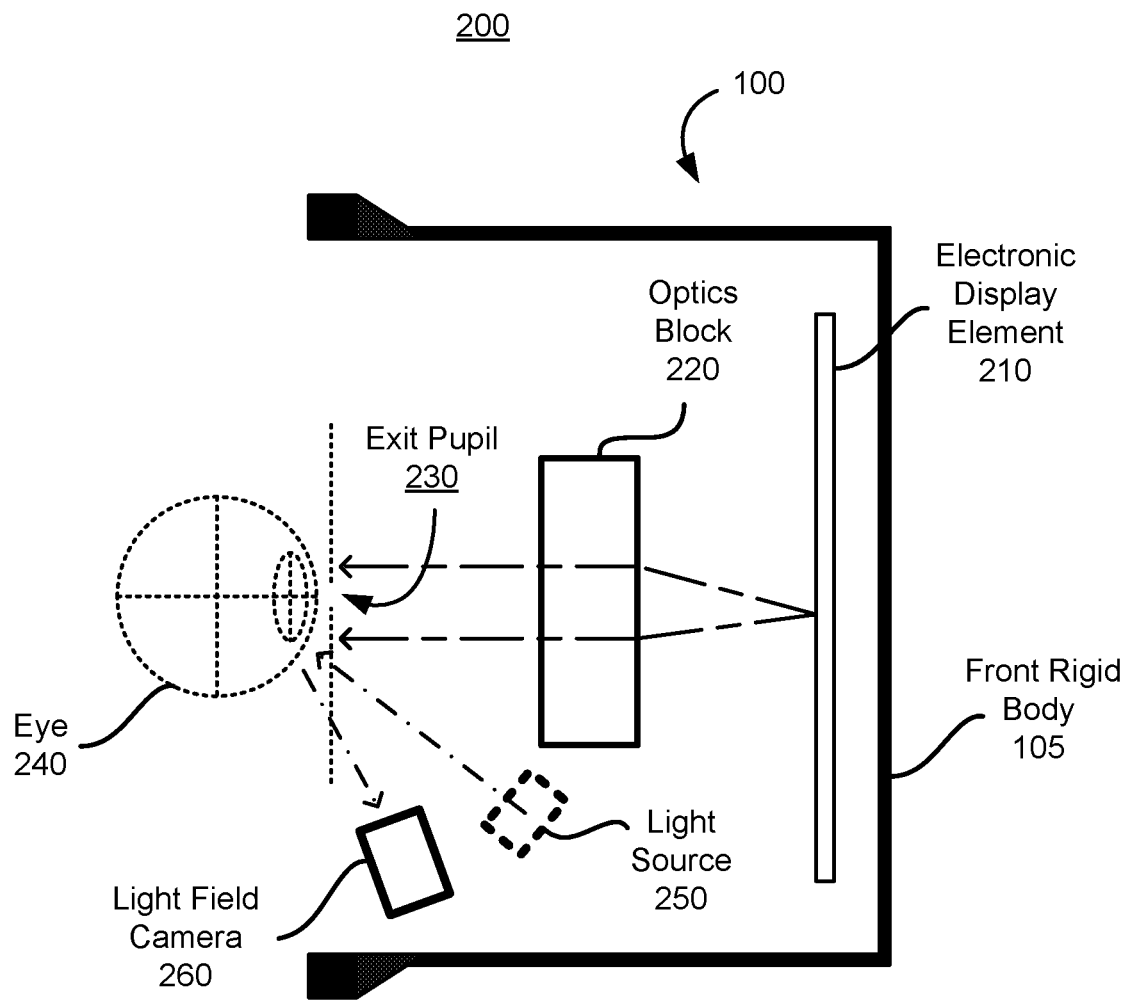
FIG. 2 is a cross sectional view of a front rigid body of the HMD shown in FIG. 1 in accordance with an embodiment.

FIG. 2 is a cross sectional view of the front rigid body 105 of the HMD 100 shown in FIG. 1 in accordance with an embodiment. The front rigid body 105 includes an electronic display element 210, an optics block 220, a light source 250, and a light field camera 260.

The electronic display element 210 displays images and/or video to the user as generated by the HMD 100 or another device. In particular, the electronic display element 210 emits image light toward the optics block 220. Examples of the electronic display element 210 include: a liquid crystal display (LCD), an organic light emitting diode (OLED) display, an active-matrix organic light-emitting diode display (AMOLED), a transparent organic light-emitting diode display (TOLED), some other display, or some combination thereof.

The optics block 220 magnifies received image light from the electronic display element 210, corrects optical errors associated with the image light, and presents the corrected image light to a user of the HMD 100. The optics block 220 directs the magnified and/or corrected image light to the exit pupil 230 for presentation to a user wearing the HMD 100. The exit pupil 230 is the location of the front rigid body 105 where an eye 240 of the user wearing the HMD 100 is positioned. For purposes of illustration, FIG. 2 shows a cross section of a right side of the front rigid body 105 (from the perspective of the user) associated with a single eye 240, but another optics block, separate from the optics block 220, provides altered image light to another eye (i.e., a left eye) of the user.

In an embodiment, the optics block 220 includes one or more optical elements and/or combinations of different optical elements. For example, an optical element is an aperture, a Fresnel lens, a convex lens, a concave lens, a filter, or any other suitable optical element that affects the image light emitted from the electronic display element 210. In some embodiments, one or more of the optical elements in the optics block 220 may have one or more coatings, such as anti-reflective coatings.

Magnification of the image light by the optics block 220 allows the electronic display element 210 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 220 is designed so its effective focal length is larger than the spacing to the electronic display element 210, which magnifies the image light projected by the electronic display element 210. Additionally, in some embodiments, the amount of magnification is adjusted by adding or removing optical elements.

In some embodiments, the optics block 220 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display element 210 for display is pre-distorted, and the optics block 220 corrects the distortion when it receives image light from the electronic display element 210 generated based on the content.

The HMD 100 optionally includes the light source 250 to illuminate an eye 240 of the user wearing the HMD 100. As shown in FIG. 2, the light source 250 is positioned out of a line of sight of the user and below the user's eye 240. In other embodiments, the light source 250 may be positioned at any location inside the front rigid body 105 such that light emitted by the light source 250 illuminates the eye 240. The light source 250 may emit light in the near infrared (NIR) band (i.e., ~830 nm to 880 mm), or some other portion of the electromagnetic spectrum. NIR spectrum light may be advantageous in some embodiments because the NIR spectrum light is not visible to the human eye and thus, does not distract the user wearing the HMD 100 during operation. In some embodiments, light emitted from the electronic display element 210 may be sufficient to illuminate the eye 240, and the light source 250 may not be used or may not be included within the HMD 100.

The light field camera 260 (also referred to as a plenoptic camera) captures plenoptic images of a user's eye inside the HMD 100. Plenoptic images include light intensity data and light ray direction data (e.g., angular data). In some embodiments, the light field camera 260 includes a notch filter that filters certain wavelengths of light. For example, in an embodiment where the HMD 100 includes a light source 250 that emits IR light, the light field camera 260 includes a notch filter that only passes IR light into the light field camera 260. Thus, the notch filter can improve the signal-to-noise ratio of the plenoptic image data generated by the light field camera 260.

In one embodiment, the light field camera 260 has a single lens (e.g., with a diameter of 1 millimeter) positioned approximately 15 millimeters away from the eye 240. Further, the light field camera 260 may include an array of micropixels located behind the single lens. Each micropixel samples a light ray emitted by the light source 250 and reflected off of the eye 240 or another portion of the user's face. Since each micropixel is located at a different position, the light ray sampled by each micropixel is focused by the single lens at a different angle. Each micropixel generates data indicating the light intensity and light ray direction captured at the particular micropixel.

The light field camera 260 provides a captured plenoptic image to an eye tracking system's controller (not shown). The controller determines a gaze direction of the user's eye using the plenoptic image, which is further described below with reference to FIGS. 3A-3B.

Figure 3A:
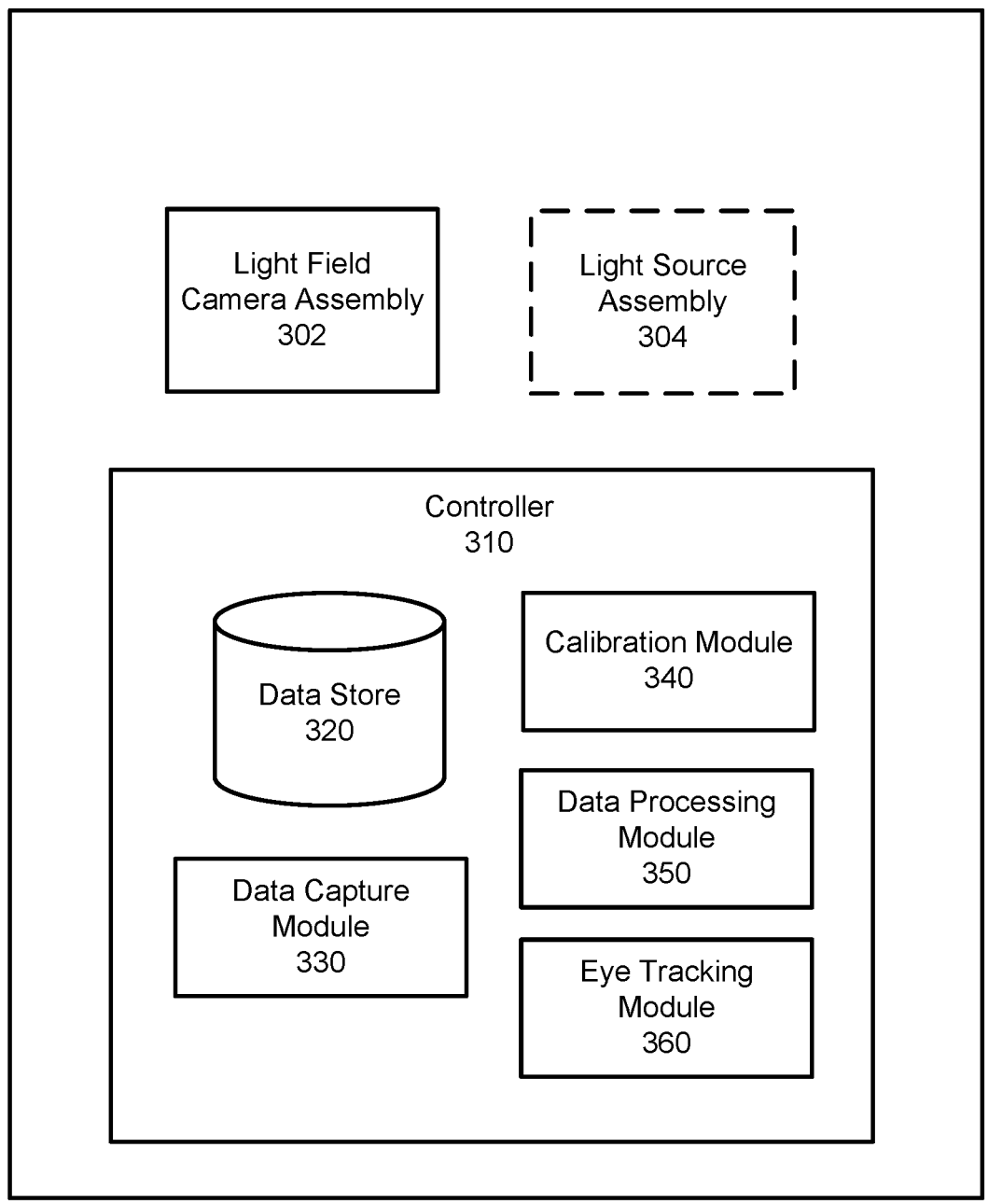
FIG. 3A is a block diagram of an eye tracking system in accordance with an embodiment.

FIG. 3A is a block diagram of an eye tracking system 300 in accordance with an embodiment. In some embodiments, the eye tracking system 300 includes a light field camera assembly 302 and a controller 310. The eye tracking system 300 also optionally includes a light source assembly 304. The eye tracking system 300 tracks gaze direction of one or both eyes of a user while the user is wearing the HMD 100. In some embodiments, the light source assembly 304 and the light field camera assembly 302 are communicatively coupled to the controller 310 that performs data processing for generating gaze direction, performing optical actions, and the like.

The light field camera assembly 302 includes one or more light field cameras (e.g., the light field camera 260 shown in FIG. 2). In one embodiment, the light field camera assembly 302 includes two light field cameras, e.g., a first light field camera that captures plenoptic images of the user's left eye and a second light field camera that captures plenoptic images of the user's right eye. The light field cameras of the light field camera assembly 302 may be coordinated with each other. For example, the first light field camera and the second light field camera simultaneously capture plenoptic images of the left eye and right eye, respectively. In alternate embodiments, the light field camera assembly 302 includes a single light field camera that is positioned to captured plenoptic images of only one eye of the user. Alternatively, the single light field camera may be located such it captures plenoptic images from either eye.

The light source assembly 304 includes one or more light sources (e.g., the light source 250 shown in FIG. 2). In some embodiments, the light source assembly 304 includes one light source that illuminates both eyes of the user. In other embodiments, the light source assembly 304 includes multiple light sources, e.g., a left light source to illuminate the left eye and a right light source to illuminate the right eye. A light source may emit light in the NIR band, or some other portion of the electromagnetic spectrum.

The controller 310 controls the eye tracking system 300. The controller 310 includes a data store 320, a data capture module 330, a calibration module 340, a data processing module 350, and an eye tracking module 360. In other embodiments, different and/or additional components may be included in the controller 310. In the example shown in FIG. 3A, the controller 310 is part of the eye tracking system 300, and thus also part of the HMD 100. In other embodiments, some, or all, of the controller 310 is outside of the HMD 100, e.g., the controller 310 is included as part of a console or included in another component and/or system. Having the controller 310 outside of the HMD 100 may be an advantage in some embodiments because the HMD 100 can reduce the required amount of processing power to execute functions of the controller; in embodiments where the HMD 100 is powered with a rechargeable battery, reducing the processing power increases the battery life of the HMD 100.

The data store 320 stores data recorded by, or used by, the eye tracking system 300. Stored data may include, e.g., plenoptic images, light field model information, eye tracking information, calibration data, some other information used for eye tracking, or some combination thereof. The data store 320 may store information retrieved from a source outside of the eye tracking system 300, e.g., from a console or from an online source. Other modules of the eye tracking system 300 store information to the data store 320 and/or retrieve information from the data store 320.

In embodiments where the HMD 100 includes a light source assembly, the data capture module 330 coordinates control of each light source and light field camera. In some embodiments, the data capture module 330 provides instructions to one or more light sources to illuminate the eyes and/or face of a user. In conjunction, the data capture module 330 also provides instructions to one or more light field cameras to capture one or more plenoptic images of the illuminated portions of the eye (e.g., portions inside the HMD 100). Thus, the data capture module 330 also may synchronize the illuminations and the image frame captures. For example, if the light sources emit light at a rate of 60 illuminations per second, then the light field cameras capture frames at a rate of at least 60 frames per second to achieve a desired eye tracking data resolution. In an embodiment, the data capture module 330 stores the captured plenoptic images in the data store 320 and/or any other database on or off of the HMD 100 that the eye tracking system 300 can access.

The calibration module 340 performs a calibration routine to calibrate the HMD 100 for a given user wearing the HMD 100. In one embodiment, the calibration module 340 provides instructions for the given user to look in one or more different directions, e.g., up, left, right, down, diagonally to the up and left, etc. The instructions may be shown on the electronic display element 210 or played by speakers of the HMD 100 as an audio instruction. In coordination with the instructions, the data capture module 330 provides commands to the light field cameras (and optionally, to the light sources if included in the HMD 100) to capture plenoptic images of the user's eye looking in each of the different directions. The calibration module 340 uses the captured plenoptic images to generate calibration data describing the eye of the given user. Different users may have different sized eyes (e.g., different radius of the iris and/or eyeball). Thus, the eye tracking system 300 can use the calibration data to distinguish different sized eyes, rather than using a generic model with a standard size for all users' eyes.

The data processing module 350 generates a three-dimensional (3D) light field model of the user's eye using one or more plenoptic images captured by the light field cameras. In particular, each plenoptic image includes depth information about objects in the plenoptic image. The data processing module 350 uses the depth information to update the 3D light field model of the user's eye. For example, based on the depth information of an image of the user's eye, the data processing module 350 determines that the depth at several pixels of the image has changed. The change in depth is due to the user moving the user's eye, e.g., to look toward a certain direction. The data processing module 350 updates the 3D light field model to reflect the new position of the user's eye looking in the certain direction.

Figure 5A:
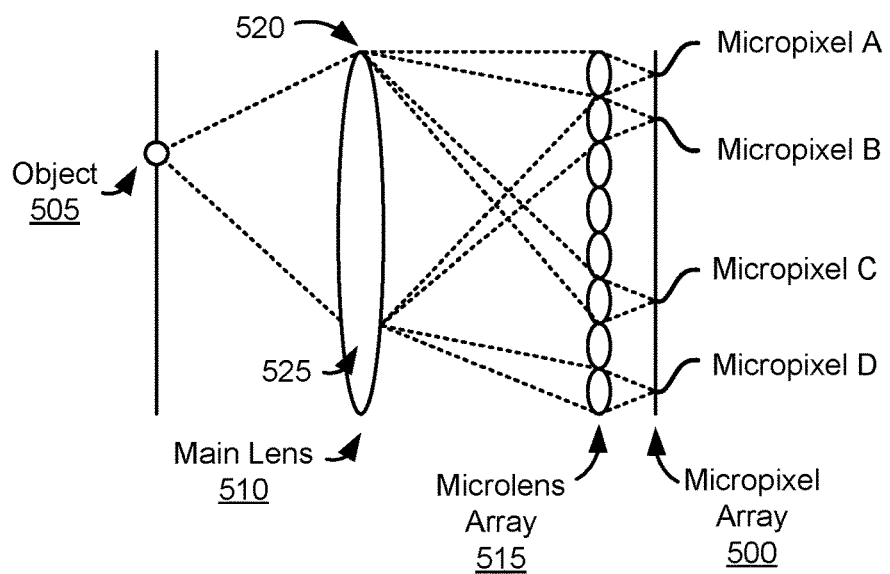
FIG. 5A is a diagram of a micropixel array in accordance with an embodiment.

FIG. 5A is a diagram of a micropixel array 500 in accordance with an embodiment. The light field camera includes a main lens 510, microlens array 515, and micropixel array 500 in the embodiment shown in FIG. 5A. In this example, the microlens array 515 is positioned at the focal plane of the main lens 510. Additionally, each micropixel of the micropixel array 500 captures light from a sub-aperture of the main lens 510. For instance, the main lens 510 includes multiple sub-apertures such as sub-aperture 520 and sub-aperture 525. Multiple micropixels may capture light from the same sub-aperture. For example, micropixel A and micropixel C each capture light from sub-aperture 520; micropixel B and micropixel D each capture light from sub-aperture 525. A group of micropixels use the captured light to generate a "sub-aperture image" of the scene associated with that particular sub-aperture. For example, micropixels A and C generate sub-aperture image A; micropixels B and D generate sub-aperture image B.

Multiple micropixels may capture light reflected from an object 505 imaged in the scene. Furthermore, each micropixel captures light from the object 505 via different sub-apertures of the main lens 510. Thus, the light field camera can capture multiple sub-aperture images of the object 505 in the scene. The data processing module 350 can use the multiple sub-aperture images to determine depth information and/or update a 3D light field model. In some embodiments, the depth estimation mechanism of the light field camera described above is similar to depth estimation using a stereo camera pair. However, the light field camera shown in FIG. 5A includes more than one pair of cameras (e.g., multiple pairs of micropixel combinations).

Figure 5B:
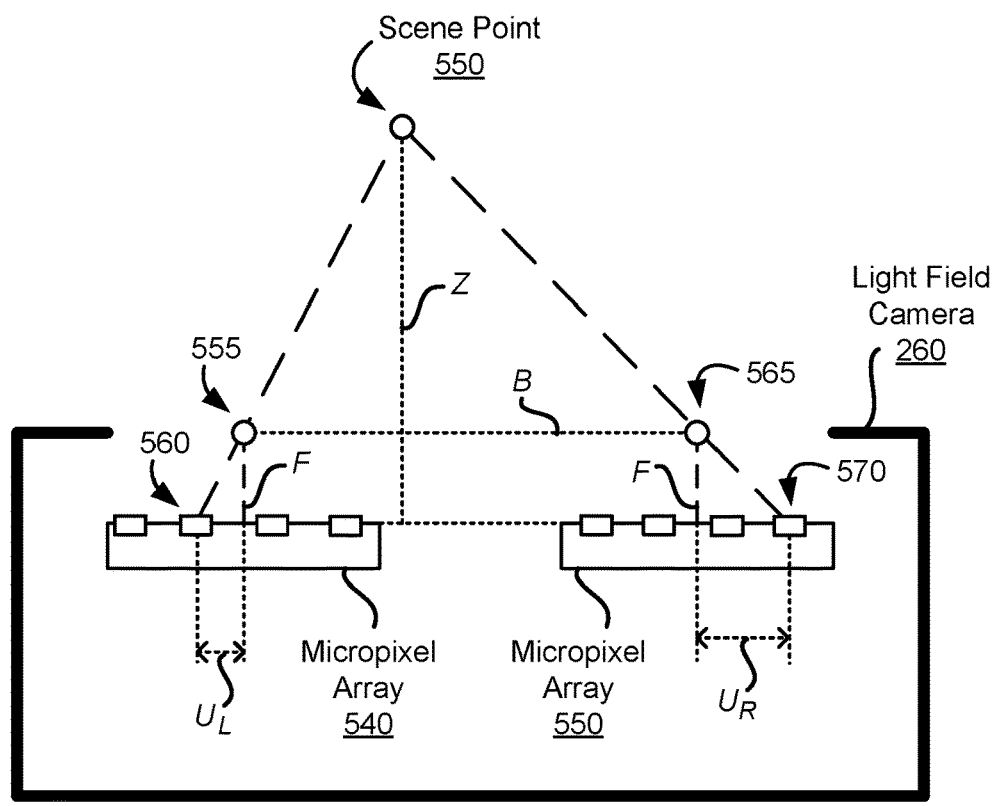
FIG. 5B is a diagram of a pair of micropixels in accordance with an embodiment.

FIG. 5B is a diagram of a pair of micropixels in accordance with an embodiment. The micropixel array 540 includes micropixels 560 and the micropixel array 550 includes micropixel 570. Though micropixel arrays 540 and 550 are shown as separate micropixel arrays in FIG. 5B, in some embodiments, the micropixel arrays 540 and 550 are part of the same micropixel array. The pair of micropixels 560 and 570 captures light rays from a scene point 550, e.g., light rays reflected from an illuminated eye of a user wearing the HMD 100. The micropixel 560 captures a light ray intersecting the focal point 555. The micropixel 570 captures a light ray intersecting the focal point 565. Focal points 555 and 565 are located at a distance, focal length F, from the center of the micropixel arrays 540 and 550, respectively.

Additionally, focal points 555 and 565 are separated from each other by a distance, baseline length B. The micropixel 560 is located at a distance $U_L$ from the center of the micropixel array 540. The micropixel 570 is located at a distance $U_R$ from the center of the micropixel array 550. The horizontal shift ΔU between the left and right light rays is the magnitude of the difference between the distances $U_L$ and $U_R$. The data processing module 350 may calculate the depth Z of the scene point 550 using the equation: $Z=B \cdot F/\Delta U$.

Since the micropixel array 500 includes multiple micropixels, the light field camera 260 can image the scene point 550 multiple times (e.g., capturing multiple sub-aperture images). For example, the micropixel array 500 includes nine micropixels, so each micropixel can capture light rays along with each of the other eight micropixels. Thus, the data processing module 350 may calculate depths Z of the scene point 550 based on multiple combinations of micropixels and average the depths to determine an aggregate depth (e.g., to increase the accuracy of the depth calculation) to update the 3D light field model.

In one embodiment, each pixel of a plenoptic image frame includes seven parameters of data: the x, y, and z position of the pixel in the light field camera 260, the time the plenoptic image frame was captured, the intensity of the captured light, and the pitch and yaw angle of the captured light ray. In some embodiments, the data processing module 350 generates a four-dimensional (4D) light field representation of each light ray of the plenoptic image frame data. For example, the 4D light field specifies two points in two distinct planes, which includes both location and directional information of a captured light ray. In some embodiments, the data processing module 350 also uses the calibration data to generate the 3D light field model. For example, the data processing module 350 can generate a more accurate 3D light field model using the size of the iris as indicated by the calibration data.

In some embodiments, the data processing module 350 generates separate light field models for each of the user's left and right eye. In other embodiments, the data processing module 350 generates a single light field model using aggregated plenoptic image frames describing the user's left and right eye. In one embodiment, the data processing module 350 provides the plenoptic image frames to a console outside of the HMD 100. Then, the data processing module 350 receives, from the console, a light field model generated by the console using the plenoptic image frames. The HMD 100 may save resources such as processing time and power by off-loading the light field model generation process to the console.

The eye tracking module 360 determines the gaze direction of an eye of a user wearing the HMD 100. In particular, the eye tracking module 360 identifies an iris plane of the eye based on the 3D light field model generated by the data processing module 350. The iris plane is a plane that approximates the surface of the iris of the eye because the actual iris has a slight curvature. The gaze direction of the eye is the normal (e.g., orthogonal) to the center of the iris plane. If the user's gaze direction changes (e.g., the user's eye looks up or down) the iris plane also changes accordingly, and vice versa. The 3D light field model describes the position and angle of the pupil and iris of the eye of the user relative to a light field camera (or any other reference point in the HMD 100 such as the center of the front rigid body 105). Thus, the eye tracking module 360 can identify the iris plane by approximating a plane in 3D space that is parallel to the iris and centered about the pupil in the 3D light field model. The eye tracking module 360 can also identify a region of the iris plane that includes the iris in the 3D light field model because the iris is not as large as the whole plane. The eye tracking module 360 can also identify the region of the iris plane without necessarily having information for the whole plane. For instance, portions of the whole plane are not visible to the light field camera 260 when the user's eye is only partially open (e.g., blocked by an eyelid).

The eye tracking module 360 determines the gaze direction by identifying a normal to the center of the iris plane. For example, if the iris plane is angle upward (e.g., because the user's eye is gazing toward the user's eyebrows), the eye tracking module 360 determines that the gaze direction is also in the upward direction. The gaze direction is a vector relative to a reference point, e.g., the location of a light field camera. The gaze direction for each eye (e.g., left and right eyes) of the user is not necessarily the same, e.g., if the user is crossing the user's eyes.

Figure 3B:
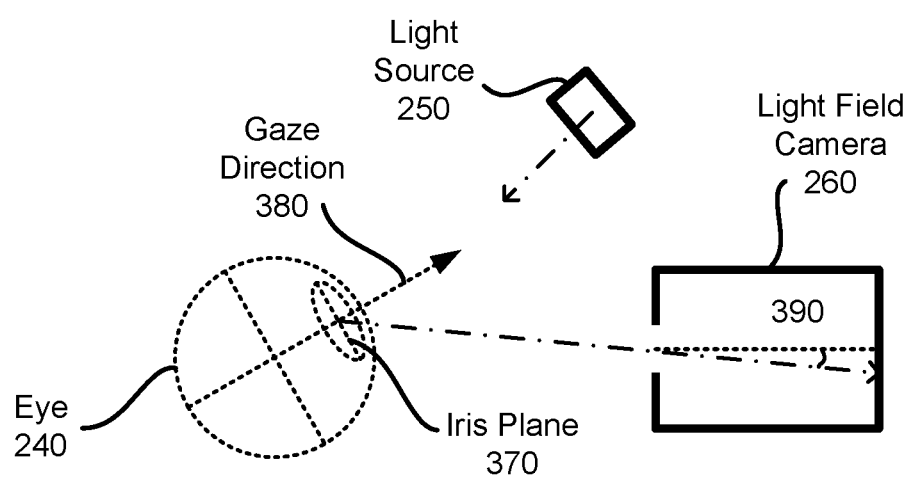
FIG. 3B is a diagram of an eye in a gaze direction in accordance with an embodiment.

FIG. 3B is a diagram of an eye 240 in a gaze direction 380 in accordance with an embodiment. A light ray emitted by the light source 250 reflects off the iris plane 370 and is captured by the light field camera 260. A micropixel of the light field camera 260 generates data indicating the light intensity of the light ray and the angle 390 representing the direction of the light ray. Based on the angle, the light field camera 260 can generate a plenoptic image including depth information.

Figure 4:
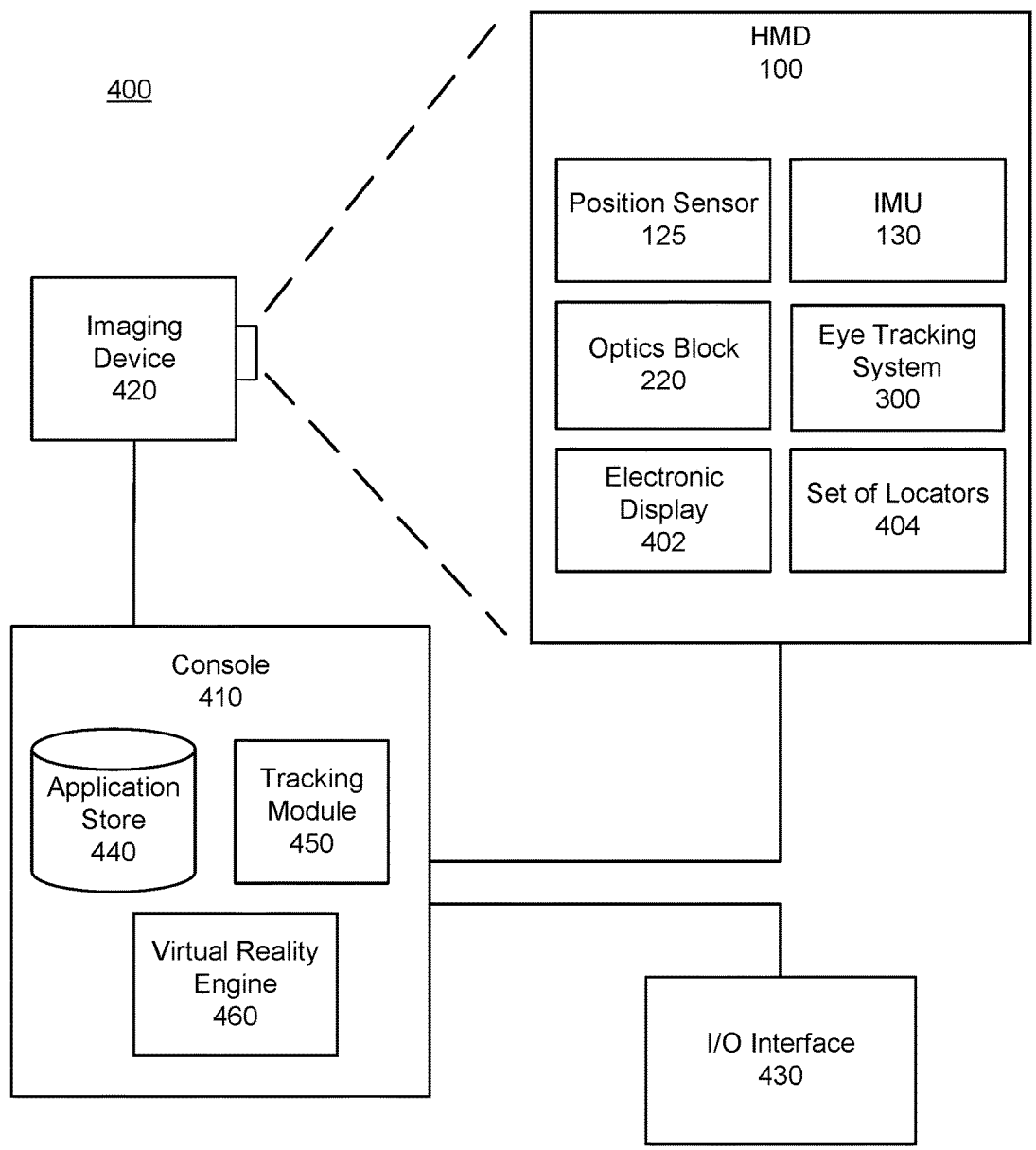
FIG. 4 is a block diagram of a system environment in accordance with an embodiment.

FIG. 4 is a block diagram of a system environment 400 in accordance with an embodiment. In some embodiments, the system 400 may operate in a VR system environment, an AR system environment, a MR system environment, or some combination thereof. The system environment 400 shown by FIG. 4 comprises an HMD 100 and an input/output (I/O) interface 430 that are communicatively coupled to the console 410. While FIG. 4 shows an example system 400 including one HMD 100 and on I/O interface 430, in other embodiments any number of these components may be included in the system environment 400. For example, there may be multiple HMDs 100 each having an associated I/O interface 430, with each HMD 100 and I/O interface 430 communicating with the console 410. In alternative configurations, different and/or additional components may be included in the system environment 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 100.

In one embodiment, the HMD 100 includes a position sensor 125, IMU 130, optics block 220, eye tracking system 300, electronic display 402, and a set of one or more locators 404. The electronic display 402 may comprise a single electronic display element or multiple electronic display elements (e.g., a display for each eye of a user). The HMD 100 is only one example of an HMD, and in other embodiments, the HMD 100 may have more or fewer components, some of which may be combined into a single component or have a different configuration or arrangement.

The IMU 130 is an electronic device that generates position data based on measurement signals received from the position sensor 125. A position sensor generates one or more measurement signals in response to motion of the HMD 100. Examples of position sensors include accelerometers, gyroscopes, and magnetometers. The position sensors may be located external to and/or internal to the IMU 130.

The imaging device 420 generates slow calibration attributes in accordance with calibration parameters received from the console 410. Slow calibration attribute includes one or more images showing observed positions of the set of locators 404 that are detectable by the imaging device 420. In some embodiments, the imaging device 420 includes one or more cameras, one or more video cameras, any other device capable of capturing images including the set of locators 404 coupled to the HMD 100, or some combination thereof. Additionally, the imaging device 420 may include one or more filters (e.g., used to increase signal to noise ratio). The imaging device 420 is configured to detect light emitted or reflected from the set of locators 404 in a field of view of the imaging device 420. In embodiments where the set of locators 404 include passive elements (e.g., a retroreflector), the imaging device 420 may include a light source that illuminates some or all of the locators 404, which retro-reflect the light towards the light source in the imaging device 420. Slow calibration attributes are communicated from the imaging device 420 to the console 410, and the imaging device 420 receives one or more calibration parameters from the console 410 to adjust one or more imaging parameters (e.g., focal length, focus, frame rate, ISO, shutter speed, aperture, etc.).

The I/O interface 430 is a device that allows a user to send action requests to the console 410. An action request is a request to perform a particular action. For example, an action request may be to start or end an application or to perform a particular action within the application. The I/O interface 430 may include one or more input devices. Example input devices include: a keyboard, a mouse, a game controller, or any other suitable device for receiving action requests and communicating the received action requests to the console 410. An action request received by the I/O interface 430 is communicated to the console 410, which performs an action corresponding to the action request. In some embodiments, the I/O interface 430 may provide haptic feedback to the user in accordance with instructions received from the console 410. For example, haptic feedback is provided when an action request is received, or the console 410 communicates instructions to the I/O interface 430 causing the I/O interface 430 to generate haptic feedback when the console 410 performs an action.

The console 410 provides content to the HMD 100 for presentation to a user in accordance with information received from one or more of: the imaging device 420, the HMD 100, and the I/O interface 430. In the example shown in FIG. 4, the console 410 includes an application store 440, a tracking module 450, and a VR engine 460. Some embodiments of the console 410 have different modules than those described in conjunction with FIG. 4. Similarly, the functions further described below may be distributed among components of the console 410 in a different manner than is described here.

The application store 440 stores one or more applications for execution by the console 410. An application is a group of instructions, that when executed by a processor, generates content for presentation to the user. Content generated by an application may be in response to inputs received from the user via movement of the HMD 100 or the I/O interface device 430. Examples of applications include: gaming applications, conferencing applications, video playback application, or other suitable applications.

The tracking module 450 calibrates the system 400 using one or more calibration parameters and may adjust one or more calibration parameters to reduce error in determination of the position of the HMD 100. For example, the tracking module 450 adjusts the focus of the imaging device 420 to obtain a more accurate position for observed locators on the HMD 100. Moreover, calibration performed by the tracking module 450 also accounts for information received from the IMU 130 of the HMD 100. Additionally, if tracking of the HMD 100 is lost (e.g., the imaging device 420 loses line of sight of at least a threshold number of the locators 120), the tracking module 450 re-calibrates some or the entire system 400.

The tracking module 450 tracks movements of the HMD 100 using slow calibration information from the imaging device 420. The tracking module 450 determines positions of a reference point of the HMD 100 using observed locators from the slow calibration information and a model of the HMD 100. The tracking module 450 also determines positions of a reference point of the HMD 100 using position information from the fast calibration information. Additionally, in some embodiments, the tracking module 450 uses portions of the fast calibration information, the slow calibration information, or some combination thereof, to predict a future location of the HMD 100. The tracking module 450 provides the estimated or predicted future position of the HMD 100 to the VR engine 460.

The VR engine 460 executes applications within the system 400 and receives position information, acceleration information, velocity information, predicted future positions, or some combination thereof of the HMD 100 from the tracking module 450. Based on the received information, the VR engine 460 determines content to provide to the HMD 100 for presentation to a user. In some embodiments, the VR engine 460 generates images for display on the HMD 100 based on gaze direction information from the eye tracking system 300. Based on the gaze direction information, the VR engine 460 may, e.g., adjust the content provided to the user such that the electronic display 402 renders high resolution content in a certain portion of the electronic display 402 (or in a certain electronic display element) corresponding to the gaze direction and renders low resolution content in other portions of the electronic display 402. This may be advantageous, e.g., because the console 410 and/or HMD 100 can save computing resources by not rendering high resolution content in all portions of the electronic display 402. In one embodiment, the VR engine 460 displays an image in a portion of the electronic display 402 corresponding to the gaze direction and turns off (e.g., does not display an image) in another portion of the electronic display 402 outside of the line of sight of the user. In embodiments where the HMD 100 is battery-powered, turning off regions of the electronic display 402 that the user does not see saves power and thus, extend the battery life of the HMD 100.

In other examples, the gaze direction may be used to generate a gaze direction of an avatar of a user, such that eye movements of the user generate corresponding eye movements of the avatar. In another example, if the received information indicates that the user has looked to the left, the VR engine 460 generates content for the HMD 100 that mirrors the user's movement in the system environment. Additionally, the VR engine 460 performs an action within an application executing on the console 410 in response to an action request received from the I/O interface 430 and provides feedback to the user that the action was performed. For example, the provided feedback includes visual or audible feedback via the HMD 100 or haptic feedback via the I/O interface 430.

Although the detailed description contains many specifics, these should not be construed as limiting the scope of the disclosure but merely as illustrating different examples and aspects of various embodiments. It should be appreciated that the scope of the disclosure includes other embodiments not discussed in detail above.

For example, various types of optical modules can be used, including reflective and catadioptric systems. In some applications, the optical module is preferably telecentric. Finally, terms such as "light" and "optical" are not meant to be limited to the visible or purely optical regions of the electromagnetic spectrum, but are meant to also include regions such as the ultraviolet and infrared (but not be limited to these).

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof. In one embodiment, a software module is implemented with a computer program product comprising a non-transitory computer-readable medium containing computer program code, which can be executed by a computer processor for performing any or all of the steps, operations, or processes described.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

What is claimed is:

1. A head mounted display (HMD) comprising:
   a display element configured to display content to a user wearing the HMD;
   an optics block configured to direct light from the display element to an exit pupil of the HMD;
   a light field camera configured to capture a plenoptic image of an eye of the user; and
   a controller configured to:
      update a light field model of the eye based on the plenoptic image of the eye,
      identify a region of a plane that includes an iris of the eye in the light field model by:
         determining the plane by approximating a curvature of a surface of the eye based on depth information from the plenoptic image; and
         identifying the region of the plane based on a size of the iris of the eye, and
      determine a gaze direction of the eye based on the identified region.

2. The HMD of claim 1, wherein the light field camera is positioned outside of a line of sight of the user.

3. The HMD of claim 1, wherein determine the gaze direction of the eye based on the identified region comprises determine a normal vector to the plane at the center of the region, the normal vector being relative to a position of the light field camera.

4. The HMD of claim 1, further comprising a light source configured to illuminate the eye.

5. The HMD of claim 4, wherein the light field camera comprises a notch filter configured to only pass light from the light source.

6. The HMD of claim 1, wherein the display element is configured to, in response to the gaze direction facing a first portion of the display element, display a first image at a first resolution at the first portion and display a second image at a second resolution lower than the first resolution at a second portion of the display element.

7. The HMD of claim 1, wherein the display element is configured to, in response to the gaze direction facing a first portion of the display element, display an image at the first portion and not display any image at a second portion of the display element outside a line of sight of the user.

8. A head mounted display (HMD) comprising:
   a display element configured to display content to a user wearing the HMD;
   a light source configured to illuminate an eye, inside the HMD, of the user;
   a light field camera configured to capture a plenoptic image of the eye; and
   a controller configured to:
      update a light field model of the eye based on the plenoptic image of the eye;
      identify a region of a plane that includes an iris of the eye in the light field model by:
         determining the plane by approximating a curvature of a surface of the eye based on depth information from the plenoptic image; and
         identifying the region of the plane based on a size of the iris of the eye; and
      determine a gaze direction of the eye based on the identified region.

9. The HMD of claim 8, wherein the light source and the light field camera are each positioned outside of a line of sight of the user.

10. The HMD of claim 8, wherein determining the gaze direction of the eye based on the identified region comprises determining a normal vector to the plane at the center of the region, the normal vector being relative to a position of the light field camera.

11. The HMD of claim 8, wherein the light source emits infrared light.

12. The HMD of claim 11, wherein the light field camera comprises a notch filter configured to only pass infrared light.

13. The HMD of claim 8, wherein the display element is configured to display, in response to the gaze direction facing a first portion of the display element, display a first image at a first resolution at the first portion and display a second image at a second resolution lower than the first resolution at a second portion of the display element.

14. The HMD of claim 8, wherein the display element is configured to, in response to the gaze direction facing a first portion of the display element, display an image at the first portion and not display any image at a second portion of the display element outside a line of sight of the user.

15. A head mounted display (HMD) comprising:
a display element configured to display content to a user wearing the HMD;
an optics block configured to direct light from the display element to an exit pupil of the HMD;
a light field camera configured to capture a plenoptic image of an eye of the user; and
a controller configured to:
receive the plenoptic image of the eye from the light field camera;
provide the plenoptic image of the eye to a virtual reality (VR) console;
receive, from the VR console, a light field model of the eye generated based on the plenoptic image of the eye, the VR console configured to:
determine a plane of the eye in the light field model by approximating a curvature of a surface of the eye based on depth information from the plenoptic image; and
identify a region of the plane, including an iris of the eye in the light field model, based on a size of the iris of the eye; and
determine a gaze direction of the eye based on the identified region of the light field model.

16. The HMD of claim 15, wherein the light field camera is positioned outside of a line of sight of the user.

17. The HMD of claim 15, further comprising a light source configured to illuminate the eye, and wherein the light field camera comprises a notch filter configured to only pass light from the light source.

18. The HMD of claim 15, wherein the display element is configured to, in response to the gaze direction facing a first portion of the display element, display a first image at a first resolution at the first portion and display a second image at a second resolution lower than the first resolution at a second portion of the display element.

19. An eye tracking system comprising:
a light field camera configured to capture a plenoptic image of an eye of a user; and
a controller configured to:
update a light field model of the eye based on the plenoptic image of the eye;
determine a plane in the light field model by approximating a curvature of a surface of the eye based on depth information from the plenoptic image;
identify a region of the plane that includes an iris of the eye based on a size of the iris of the eye; and
determine a gaze direction of the eye based on the identified region.

20. The eye tracking system of claim 19, wherein determine the gaze direction of the eye based on the identified region comprises determine a normal vector to the plane at the center of the region, the normal vector being relative to a position of the light field camera.

21. The eye tracking system of claim 19, wherein the controller is further configured to:
in response to determining that the gaze direction is facing a first portion of a display element, (i) providing a first image for display by the display element at a first resolution at the first portion and (ii) providing a second image for display by the display element at a second resolution lower than the first resolution at a second portion of the display element.

22. The eye tracking system of claim 19, wherein the controller is further configured to:
in response to determining that the gaze direction is facing a first portion of a display element, (i) providing an image for display by the display element at the first portion and (ii) determining to not provide any image for display by the display element at a second portion of the display element outside a line of sight of the user.

23. The eye tracking system of claim 19, wherein the light field camera is part of a head mounted display (HMD) worn by the user, the controller providing images or video for display by a display element of the HIVID based at least in part on the gaze direction.

* * * * *

UNITED STATES PATENT AND TRADEMARK OFFICE
CERTIFICATE OF CORRECTION

PATENT NO. : 10,120,442 B2
APPLICATION NO. : 15/387439
DATED : November 6, 2018
INVENTOR(S) : Xinqiao Liu et al.

It is certified that error appears in the above-identified patent and that said Letters Patent is hereby corrected as shown below:

In the Claims

Column 12, Claim 3, Line 1, delete "wherein determine the gaze direction of the eye" and insert -- wherein determining the gaze direction of the eye --

Column 12, Claim 3, Line 3, delete "comprises determine a normal vector" and insert -- comprises determining a normal vector --

Column 14, Claim 20, Lines 1 & 2, delete "wherein determine the gaze direction of the eye" and insert -- wherein determining the gaze direction of the eye --

Column 14, Claim 20, Line 3, delete "comprises determine a normal vector" and insert -- comprises determining a normal vector --

Signed and Sealed this
Eleventh Day of June, 2019

Andrei Iancu
*Director of the United States Patent and Trademark Office*